Figure 1:
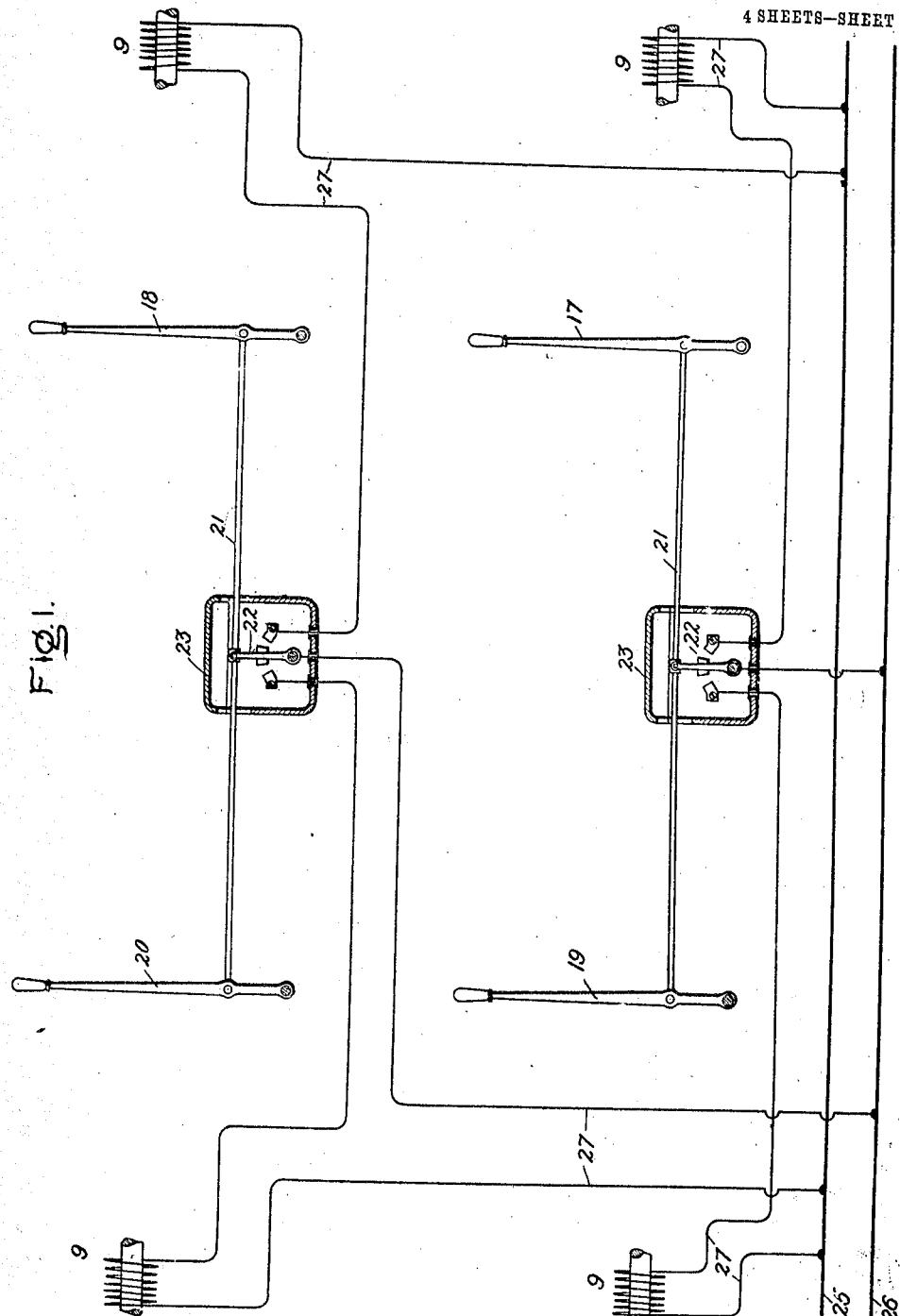

No. 872,356. PATENTED DEC. 3, 1907.
H. LEMP.
MOTOR DRIVEN BOAT.
APPLICATION FILED MAY 27, 1905.

4 SHEETS—SHEET 3.

Witnesses:

Inventor
Hermann Lemp
By Albert G. Davis
Att'y

No. 872,356. PATENTED DEC. 3, 1907.
H. LEMP.
MOTOR DRIVEN BOAT.
APPLICATION FILED MAY 27, 1905.

4 SHEETS—SHEET 4.

Witnesses:

Inventor,
Hermann Lemp,
By Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

MOTOR-DRIVEN BOAT.

No. 872,356.   Specification of Letters Patent.   Patented Dec. 3, 1907

Application filed May 27, 1905. Serial No. 262,571.

*To all whom it may concern:*

Be it known that I, HERMANN LEMP, a citizen of the United States, residing at Lynn, county of Essex, State of Massachusetts, have invented certain new and useful Improvements in Motor-Driven Boats, of which the following is a specification.

My invention relates to motor driven vessels, such for example as ferry launches or other small power driven boats.

It has for one of its objects to so arrange the parts of the power apparatus and the controlling mechanism as to render navigation comparatively easy and certain with a minimum of attendance.

It also has for its object to provide certain features of construction which have particular reference to the arrangement of the propelling system so that in case of accident, such as collision, fire, or failure of some part, the entire power apparatus is less likely to be wholly incapacitated.

In carrying out the invention, I provide separate motors which are preferably automatically-governed constant-speed gas or oil engines of any approved character. Each engine is adapted to drive a fore and an aft propeller shaft, clutches being provided between the engine and their respective shafts, so that either set of propellers can be coupled or uncoupled according to the direction to be traveled. Also with this arrangement the turning of the vessel can be easily accomplished. For example, to make a starboard turn the starboard-fore and the port-aft-propellers are operated at the same time, and to make a port turn, the port-fore and the starboard-aft propellers are simultaneously operated.

The hull, which is preferably scow shaped and made of metal, is divided by a longitudinal bulkhead into entirely independent compartments which are accessible only from the deck, and the engines are located midship in the compartments. The bulkhead thus divides the power apparatus into completely isolated units which are adapted to be operated and controlled independently. This reduces the liability of totally stalling the power system in case of accident to some part, or in case either compartment should spring a serious leak resulting from collision or otherwise. In order to further increase the safety on this score, transverse bulkheads, adjacent the stem and stern, are provided which form independent water-tight compartments through which the propeller shafts extend.

The clutches between the propeller shafts and the engines may be of any desired construction, but I prefer, however, those of the magnetically-operated type with change speed gearing. Being of the magnetic type the clutches can be operated from a remote point, such as the pilot-house. This provision in connection with the fact that the engines are adapted to run continuously and are automatically governed to maintain substantially constant speed for all loads, renders the entire control of the boat possible from the pilot house. This means that the boat can be readily managed by one man, thus lessening the operating expense. In the pilot-house I provide electric switches for controlling the circuits of the magnetic clutches between the propeller shafts and the engines and so arrange them as to be readily operated from a position at either of the steering or rudder wheels, in order to enable the pilot to couple or uncouple any or all of the propeller shafts with one hand and at the same time steering with the other. He can thus change from forward to reverse propulsion, or turn or stop the vessel, with great facility.

For a fuller understanding of the invention, attention is directed to the following description, taken with the accompanying drawings, and to the claims appended hereto.

Figure 2:
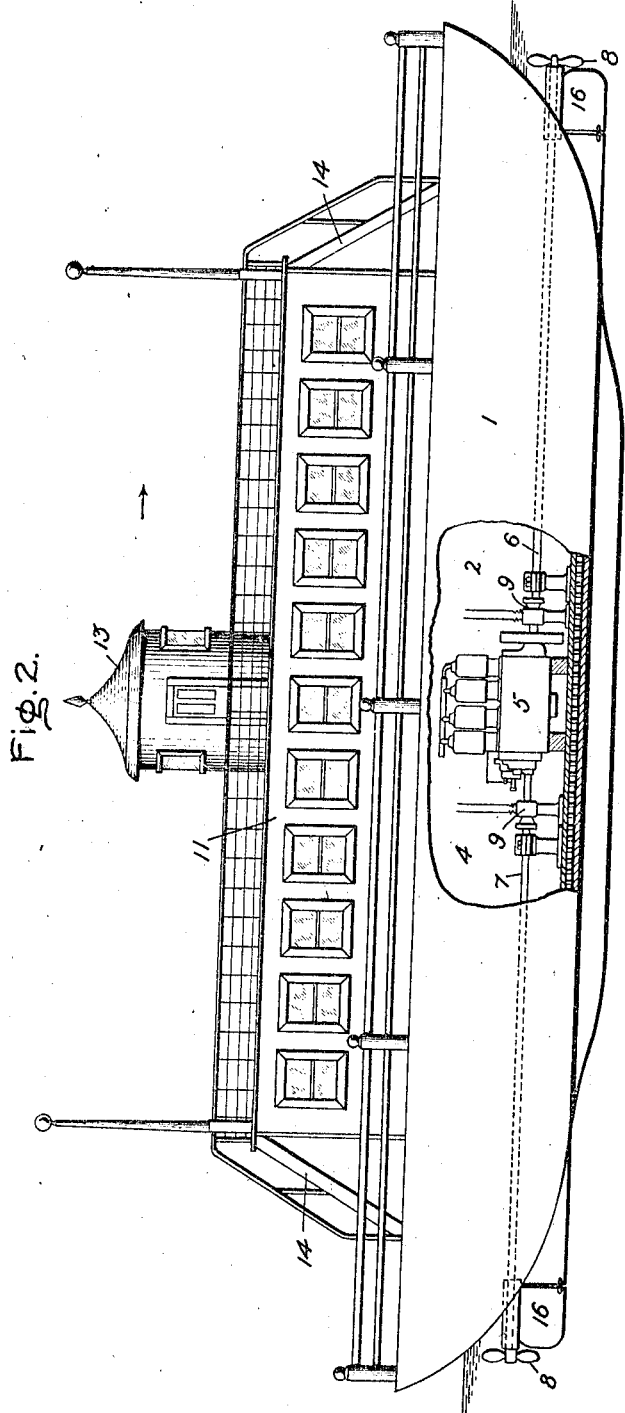
Figure 3:
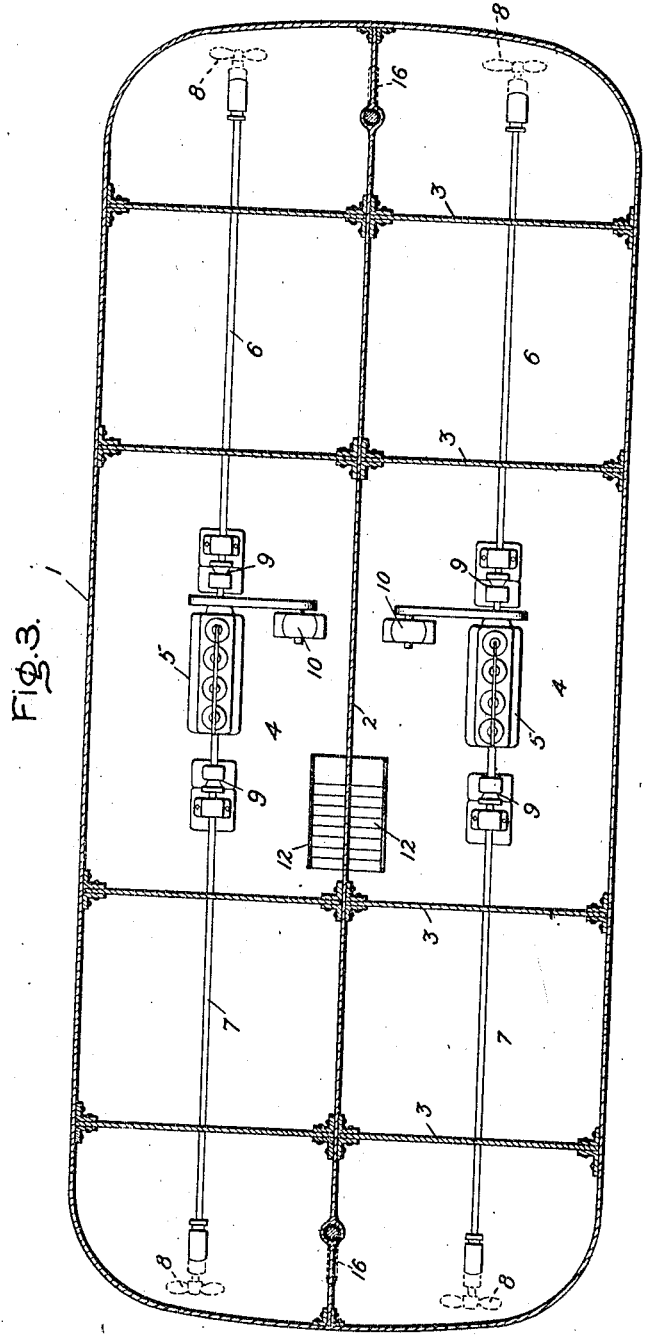
Figure 4:
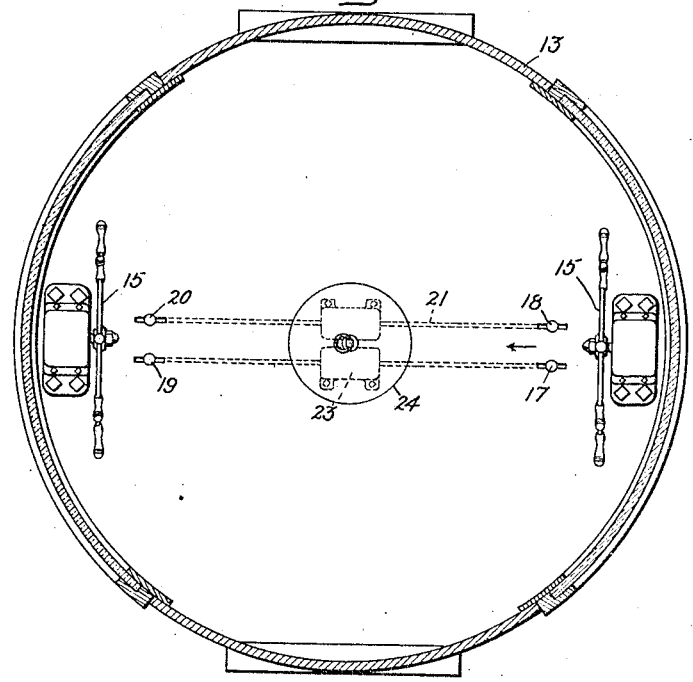
Figure 5:
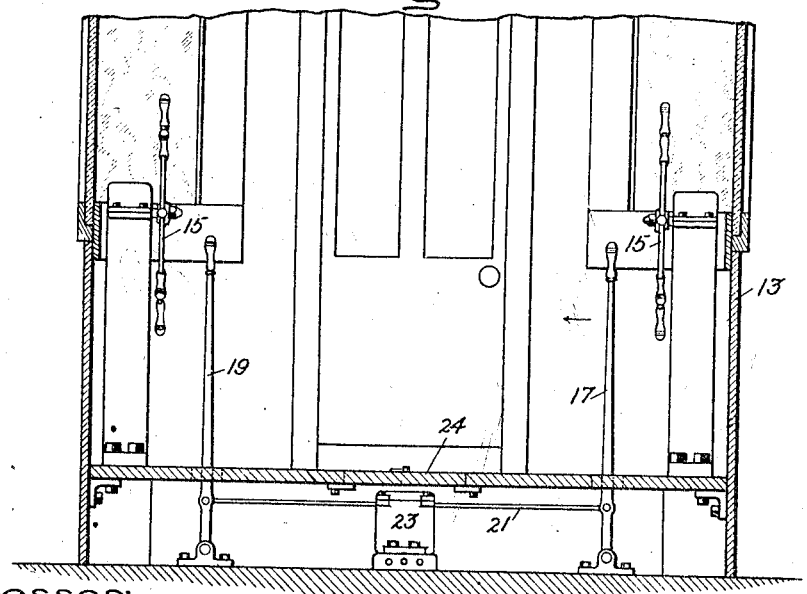

In the accompanying drawings which illustrate an embodiment of the invention, Figure 1 is a diagram of the controlling circuits of the magnetic clutches employed between the shafts of the engines and the propellers; Fig. 2 is a side elevation of the motor driven boat having a portion of the hull broken away to show one of the units of the power system; Fig. 3 is a horizontal section of the hull; Fig. 4 is a sectional plan of the pilothouse showing the controlling mechanisms; and Fig. 5 is a partial vertical section thereof.

Referring to Figs. 2 and 3, 1 represents the hull of the boat which is preferably of the scow type and made of metal with watertight and fire-proof compartments. The hull is divided from stem to stern by a bulkhead 2 forming two longitudinal compartments completely separated and independent. These compartments are further divided by transverse bulkheads 3, forming two or more smaller compartments adjacent the stem and stern and relatively larger compartments located midship. Arranged in the midship compartments 4 are the motors for operating the propeller shafts. These are preferably internal combustion engines 5 of any approved construction and they are intended to operate continuously at substantially constant speed. Any suitable governing mechanism for this purpose may be employed. The engines are adapted to drive fore and aft propeller shafts 6 and 7 which extend through the transverse bulkheads and carry at their outer ends propellers 8. As the engines operate continuously only in one direction, both fore and aft propellers are constructed the reverse of each other. Hence, only one shaft of each engine is adapted to operate at a time, depending upon the direction of travel. Clutches are provided between the shafts and the engines for this purpose. The clutches are shown diagrammatically at 9. These can be of any approved construction, preferably including suitable gearing so that various propelling speeds may be obtained.

The engines each drive a dynamo 10 which serves to furnish current for lighting the boat, for the ignition system of the engines and for the clutches. Each engine may also drive an emergency pump to be used in case of leakage in any of the compartments. It will thus be seen that each engine and its auxiliary apparatus is completely independent so that one or the other will most likely be available at all times in case of accident. Access to each engine compartment is provided from the deck or the passenger cabin 11 by separate companion ways 12, Fig. 3.

Located on the second deck or the cabin is a pilot-house 13 which is accessible from the main deck by companion ways 14, Fig. 2. In the pilot-house are fore and aft rudder steering wheels 15 which are mechanically connected or otherwise to the rudders 16, and adjacent each wheel is a set of two controllers which are adapted to control the switches of the clutch circuits, Figs. 4 and 5. According to their location they may be described as fore-starboard and port-controllers 17 and 18, respectively, and aft-starboard and port-controllers 19 and 20, respectively. The two port-controllers are mechanically connected by links 21, Figs. 1, 4 and 5, as are also the starboard-controllers, so that any of the circuits can be opened or closed by the pilot while operating either of the steering wheels. Connected with each link 21 is a double-throw switch 22, one controlling the starboard clutches and the other the port clutches. The switches are located in a casing 23 under the floor of the pilot-house to which access is had through a door 24.

Referring to Fig. 1, 25 and 26 are mains supplied with current from the dynamos for operating the clutches. Connected in parallel with the mains are four clutch circuits 27 which are controlled by the double-throw switches 22. In the figure the clutches are shown diagrammatically, no attempt being made to show structural features.

The operation is as follows: Assuming the engines to be operating, the propeller shafts idle, and the controllers in mid position as shown in Fig. 1. In order to start the boat to travel in the direction indicated by the arrow, Fig. 2, the pilot, standing at the fore steering wheel, Figs. 4 and 5, throws the controllers adjacent him toward the left or in the direction indicated by the arrow, thereby closing the circuits of the two aft clutches. The stern propeller shafts are thus coupled to the engine and the boat driven forward. When it is desired to stop propulsion, the controllers are thrown to mid position, or if it is desired to stop suddenly, the controllers are thrown to the extreme right, thereby connecting the stem propellers to the engine to "back water." The controllers are also moved to the latter position when it is desired to reverse propulsion. In order to assist the steering or turning of the vessel, the propellers may also be employed in connection with the rudders, in which case, one controller is thrown to the extreme left and the other to the extreme right, according to the direction to be traveled.

In accordance with the provisions of the patent statutes, I have described the principle of operation of my invention together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,

1. In a motor driven boat, the combination of a hull, a longitudinal bulkhead dividing the hull into two water-tight compartments, a continuously operating prime mover in each compartment, propeller shafts, electrically operated clutches for connecting and disconnecting the propeller shafts with respect to the prime movers, and controllers for the clutches located adjacent the steering wheel of the boat.

2. In a motor driven boat, the combination of a plurality of automatically and continuously operated internal combustion engines, fore and aft propeller shafts for each engine, independently actuated electrically-controlled power-transmitting connections between the shafts and their respective engines, and controllers for said connections located adjacent the steering wheel of the boat.

3. In a motor driven boat, the combination of a plurality of continuously-operating automatically-governed internal combustion engines, propeller shafts, electrically-controlled power transmitting connections between the shafts and the engines, separate circuits controlling said connections, and separate sets of controllers located to be operated from different points for opening and closing the said circuits.

4. In a motor driven boat, the combination of a hull, a longitudinal bulkhead which divides the hull into independent compartments, an automatically-governed internal combustion engine in each compartment, fore and aft propeller shafts for each engine, electrically-controlled power-transmitting connections between the shafts and the engines, separate circuits controlling the said connections, a pilot-house, means located in the pilot-house for opening and closing said circuits, and separate sets of controllers located at different points in the pilot-house for operating the circuit controlling means.

In witness whereof I have hereunto set my hand this 24th day of May, 1905.

HERMANN LEMP.

Witnesses:
JOHN A. McMANUS, Jr.,
HENRY O. WESTENDARP.